US010332190B1

(12) United States Patent
Yavorsky et al.

(10) Patent No.: US 10,332,190 B1
(45) Date of Patent: Jun. 25, 2019

(54) SYSTEM AND METHOD FOR TRADE PAYMENT EXCHANGE

(71) Applicant: JPMorgan Chase Bank, N.A., New York, NY (US)

(72) Inventors: Michael L. Yavorsky, Evanston, IL (US); Joseph J. Barbieri, Gurnee, IL (US); Tom Yiu Fai Mou, Chicago, IL (US); Muliyil Shridhar, Chicago, IL (US); Kyung (Joanna) Hee Shin, Chicago, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 997 days.

(21) Appl. No.: 14/228,895

(22) Filed: Mar. 28, 2014

Related U.S. Application Data

(62) Division of application No. 10/767,445, filed on Jan. 30, 2004, now abandoned.

(51) Int. Cl.
*G06Q 10/00* (2012.01)
*G06Q 30/06* (2012.01)
*G06Q 40/02* (2012.01)
*G06Q 30/04* (2012.01)
*G06Q 10/06* (2012.01)

(52) U.S. Cl.
CPC ......... *G06Q 30/0635* (2013.01); *G06Q 30/04* (2013.01); *G06Q 40/025* (2013.01); *G06Q 10/063* (2013.01)

(58) Field of Classification Search
CPC ...... B42D 25/00; G07D 7/0033; G06F 17/00; G06F 17/30253; G06Q 10/08; G06Q 10/087; G06Q 20/203; G06Q 10/0833; G06Q 30/018

USPC ................... 705/28, 37; 292/307 R; 717/121
See application file for complete search history.

(56) References Cited

U.S. PATENT DOCUMENTS

| 3,316,395 A | 4/1967 | Lavin |
| 3,653,480 A | 4/1972 | Yamamoto et al. |
| 3,896,266 A | 7/1975 | Waterbury |
| 4,050,375 A | 9/1977 | Orlens |

(Continued)

FOREIGN PATENT DOCUMENTS

| WO | WO 94/28497 | 5/1994 |

OTHER PUBLICATIONS

Visa & Carnegie Mellon Plan Online Payment Scheme Feb. 15, 1995, 2 pages, Newsbytes News Network.

(Continued)

*Primary Examiner* — Susanna M. Diaz
(74) *Attorney, Agent, or Firm* — Hunton Andrews Kurth LLP

(57) ABSTRACT

A system and method for exchanging information and documents related to the processing of trade transactions is provided. The method comprises associating at least one unique identifier with at least one shipping document; and posting the at least one unique identifier and the least one shipping document on a first communications network. A system for exchanging information and documents related to the processing of trade transactions is also provided. The system comprises means for associating at least one unique identifier with at least one shipping document; and means for posting the at least one unique identifier and the at least one shipping document on a network for viewing.

3 Claims, 11 Drawing Sheets

(56) References Cited

U.S. PATENT DOCUMENTS

| | | |
|---|---|---|
| 4,141,078 A | 2/1979 | Bridges et al. |
| 4,322,613 A | 3/1982 | Oldenkamp |
| 4,396,985 A | 8/1983 | Ohara |
| 4,523,297 A | 6/1985 | Ugon et al. |
| 4,594,663 A | 6/1986 | Nagata et al. |
| 4,621,325 A | 11/1986 | Naftzger et al. |
| 4,634,845 A | 1/1987 | Hale et al. |
| 4,672,377 A | 6/1987 | Murphy et al. |
| 4,700,055 A | 10/1987 | Kashkashian, Jr. |
| 4,711,993 A | 12/1987 | Kosednar et al. |
| 4,713,761 A | 12/1987 | Sharpet et al. |
| 4,797,913 A | 1/1989 | Kaplan et al. |
| 4,799,156 A | 1/1989 | Shavit et al. |
| 4,812,628 A | 3/1989 | Boston et al. |
| 4,866,634 A | 9/1989 | Reboh et al. |
| 4,870,260 A | 9/1989 | Niepolomski et al. |
| 4,807,177 A | 12/1989 | Ward |
| 4,893,333 A | 1/1990 | Baran et al. |
| 4,916,296 A | 4/1990 | Streck |
| 4,939,674 A | 7/1990 | Price et al. |
| 4,947,028 A | 8/1990 | Gorog |
| 4,972,318 A | 11/1990 | Brown et al. |
| 4,975,841 A | 12/1990 | Kehnemuyi et al. |
| 4,984,155 A | 1/1991 | Geier et al. |
| 4,988,849 A | 1/1991 | Sasaki et al. |
| 4,992,940 A | 2/1991 | Dworkin |
| 5,023,904 A | 6/1991 | Kaplan et al. |
| 5,047,614 A | 9/1991 | Bianco |
| 5,053,607 A | 10/1991 | Carlson et al. |
| 5,054,096 A | 10/1991 | Beizer |
| 5,111,395 A | 5/1992 | Smith et al. |
| 5,117,354 A | 5/1992 | Long et al. |
| 5,168,144 A | 12/1992 | Cukor et al. |
| 5,175,682 A | 12/1992 | Higashiyama et al. |
| 5,204,821 A | 4/1993 | Inui et al. |
| 5,206,803 A | 4/1993 | Vitagliano et al. |
| 5,224,034 A | 6/1993 | Katz et al. |
| 5,225,978 A | 7/1993 | Petersen et al. |
| 5,237,159 A | 8/1993 | Stephens et al. |
| 5,237,620 A | 8/1993 | Deaton et al. |
| 5,239,462 A | 8/1993 | Jones et al. |
| 5,241,161 A | 8/1993 | Zuta |
| 5,249,044 A | 9/1993 | Von Kohorn |
| 5,252,815 A | 10/1993 | Pernet |
| 5,262,860 A | 11/1993 | Fitzpatrick et al. |
| 5,262,941 A | 11/1993 | Saladin et al. |
| 5,274,547 A | 12/1993 | Zoffel et al. |
| 5,283,829 A | 2/1994 | Anderson |
| 5,287,269 A | 2/1994 | Dorrough et al. |
| 5,308,959 A | 5/1994 | Cherry |
| 5,311,594 A | 5/1994 | Penzias |
| 5,326,959 A | 7/1994 | Perazza |
| 5,339,239 A | 8/1994 | Manabe et al. |
| 5,350,906 A | 9/1994 | Brody et al. |
| 5,367,581 A | 11/1994 | Abel et al. |
| 5,373,550 A | 12/1994 | Campbell et al. |
| 5,380,991 A | 1/1995 | Valencia et al. |
| 5,396,417 A | 3/1995 | Burks et al. |
| 5,396,650 A | 3/1995 | Terauchi |
| 5,402,474 A | 3/1995 | Miller et al. |
| 5,412,190 A | 5/1995 | Josephson et al. |
| 5,430,644 A | 7/1995 | Deaton et al. |
| 5,438,186 A | 8/1995 | Nair et al. |
| 5,444,616 A | 8/1995 | Nair et al. |
| 5,444,841 A | 8/1995 | Glaser et al. |
| 5,448,471 A | 9/1995 | Deaton et al. |
| 5,450,134 A | 9/1995 | Legate |
| 5,459,482 A | 10/1995 | Orien |
| 5,479,532 A | 12/1995 | Abel et al. |
| 5,484,988 A | 1/1996 | Hills et al. |
| 5,488,571 A | 1/1996 | Jacobs et al. |
| 5,497,317 A | 3/1996 | Hawkins et al. |
| 5,504,677 A | 4/1996 | Pollin |
| 5,506,394 A | 4/1996 | Plesko |
| 5,506,691 A | 4/1996 | Bednar et al. |
| 5,508,731 A | 4/1996 | Kohorn |
| 5,513,250 A | 4/1996 | McAllister |
| 5,523,794 A | 6/1996 | Mankovitz et al. |
| 5,530,907 A | 6/1996 | Pavey et al. |
| 5,535,147 A | 7/1996 | Jacobs et al. |
| 5,537,315 A | 7/1996 | Mitcham |
| 5,544,040 A | 8/1996 | Gerbaulet |
| 5,550,734 A | 8/1996 | Tarter et al. |
| 5,551,021 A | 8/1996 | Harada et al. |
| 5,557,334 A | 9/1996 | Legate |
| 5,566,330 A | 10/1996 | Sheffield |
| 5,583,759 A | 12/1996 | Geer |
| 5,592,378 A | 1/1997 | Cameron et al. |
| 5,594,493 A | 1/1997 | Nemirofsky |
| 5,604,542 A | 2/1997 | Dedrick |
| 5,621,201 A | 4/1997 | Langhans et al. |
| 5,640,577 A | 6/1997 | Scharmer |
| 5,649,117 A | 7/1997 | Landry |
| 5,652,602 A | 7/1997 | Fishman et al. |
| 5,659,469 A | 8/1997 | Deaton et al. |
| 5,663,766 A | 9/1997 | Sizer, II |
| 5,664,110 A | 9/1997 | Green et al. |
| 5,665,953 A | 9/1997 | Mazzamuto et al. |
| 5,671,285 A | 9/1997 | Newman |
| 5,677,955 A | 10/1997 | Doggett et al. |
| 5,678,046 A | 10/1997 | Cahill et al. |
| 5,679,938 A | 10/1997 | Templeton et al. |
| 5,679,940 A | 10/1997 | Templeton et al. |
| 5,692,132 A | 11/1997 | Hogan |
| 5,696,907 A | 12/1997 | Tom |
| 5,699,528 A | 12/1997 | Hogan |
| 5,708,422 A | 1/1998 | Blonder et al. |
| 5,715,298 A | 2/1998 | Rogers |
| 5,715,314 A | 2/1998 | Payne et al. |
| 5,717,989 A | 2/1998 | Tozzoli et al. |
| 5,724,424 A | 3/1998 | Gifford |
| 5,727,153 A | 3/1998 | Powell |
| 5,727,249 A | 3/1998 | Pollin |
| 5,728,998 A | 3/1998 | Novis et al. |
| 5,736,727 A | 4/1998 | Nakata et al. |
| 5,744,789 A | 4/1998 | Kashi |
| 5,748,780 A | 5/1998 | Stolfo |
| 5,751,953 A | 5/1998 | Shiels et al. |
| 5,758,328 A * | 5/1998 | Giovannoli ............ G06Q 30/06 705/26.4 |
| 5,763,862 A | 6/1998 | Jachimowicz et al. |
| 5,767,896 A | 6/1998 | Nemirofsky |
| 5,770,843 A | 6/1998 | Rose et al. |
| 5,770,849 A | 6/1998 | Novis et al. |
| 5,774,882 A | 6/1998 | Keen et al. |
| 5,789,733 A | 8/1998 | Jachimowicz et al. |
| 5,797,133 A | 8/1998 | Jones et al. |
| 5,805,719 A | 9/1998 | Pare, Jr. et al. |
| 5,806,044 A | 9/1998 | Powell |
| 5,809,478 A | 9/1998 | Greco et al. |
| 5,815,127 A | 9/1998 | Jacobs et al. |
| 5,819,236 A | 10/1998 | Josephson |
| 5,823,463 A | 10/1998 | Fissmann et al. |
| 5,823,464 A | 10/1998 | Bohn et al. |
| 5,832,460 A | 11/1998 | Bednar et al. |
| 5,832,463 A | 11/1998 | Funk |
| 5,832,464 A | 11/1998 | Houvener et al. |
| 5,835,603 A | 11/1998 | Coutts et al. |
| 5,845,256 A | 12/1998 | Pescitelli et al. |
| 5,852,812 A | 12/1998 | Reeder |
| 5,854,595 A | 12/1998 | Williams |
| 5,859,419 A | 1/1999 | Wynn |
| 5,864,609 A | 1/1999 | Cross et al. |
| 5,870,721 A | 2/1999 | Norris |
| 5,870,723 A | 2/1999 | Pare, Jr. et al. |
| 5,870,725 A | 2/1999 | Bellinger et al. |
| 5,878,403 A | 3/1999 | DeFrancesco et al. |
| 5,880,769 A | 3/1999 | Nemirofsky et al. |
| 5,883,810 A | 3/1999 | Franklin et al. |
| 5,897,625 A | 4/1999 | Gustin et al. |
| 5,898,157 A | 4/1999 | Mangill et al. |
| 5,917,965 A | 6/1999 | Cahill et al. |
| 5,920,847 A | 7/1999 | Kolling et al. |
| 5,930,217 A | 7/1999 | Kayanuma |

(56) References Cited

U.S. PATENT DOCUMENTS

| | | | |
|---|---|---|---|
| 5,930,776 A | 7/1999 | Dykstra et al. | |
| 5,930,778 A | 7/1999 | Geer | |
| 5,940,811 A | 8/1999 | Norris | |
| 5,940,844 A | 8/1999 | Cahill et al. | |
| 5,943,656 A | 8/1999 | Crooks et al. | |
| 5,944,461 A | 8/1999 | Kanbar | |
| 5,945,653 A | 8/1999 | Walker et al. | |
| 5,963,659 A | 10/1999 | Cahill et al. | |
| 5,966,698 A | 10/1999 | Pollin | |
| 5,966,699 A | 10/1999 | Zandi | |
| 5,970,483 A | 10/1999 | Evans | |
| 5,978,780 A | 11/1999 | Watson | |
| 5,983,206 A | 11/1999 | Oppenheimer | |
| 5,987,436 A | 11/1999 | Halbrook | |
| 5,995,947 A | 11/1999 | Fraser et al. | |
| 5,995,948 A | 11/1999 | Whitford et al. | |
| 6,003,762 A | 12/1999 | Hayashida | |
| 6,009,442 A | 12/1999 | Chen et al. | |
| 6,029,890 A | 2/2000 | Austin | |
| 6,041,315 A | 3/2000 | Pollin | |
| 6,065,675 A | 5/2000 | Teicher | |
| 6,070,150 A | 5/2000 | Remington et al. | |
| 6,151,588 A * | 11/2000 | Tozzoli | G06Q 20/10 705/35 |
| 6,181,837 B1 | 1/2001 | Cahill et al. | |
| 6,233,565 B1 | 5/2001 | Lewis et al. | |
| 6,249,775 B1 | 6/2001 | Freeman et al. | |
| 6,266,683 B1 | 7/2001 | Yehuda et al. | |
| 6,295,513 B1 | 9/2001 | Thackston | |
| 6,298,335 B1 | 10/2001 | Bernstein et al. | |
| 6,338,049 B1 | 1/2002 | Walker et al. | |
| 6,418,457 B1 | 7/2002 | Schmidt et al. | |
| 6,434,159 B1 | 8/2002 | Woodward et al. | |
| 6,460,020 B1 | 10/2002 | Pool et al. | |
| 6,502,080 B1 | 12/2002 | Eichorst et al. | |
| 6,574,377 B1 | 6/2003 | Cahill et al. | |
| 6,597,688 B2 | 7/2003 | Narasimhan et al. | |
| 6,609,125 B1 | 8/2003 | Layne et al. | |
| 6,625,642 B1 | 9/2003 | Naylor et al. | |
| 6,629,081 B1 | 9/2003 | Cornelius et al. | |
| 6,873,435 B1 | 3/2005 | Tehranchi et al. | |
| 6,970,855 B2 | 11/2005 | Das et al. | |
| 7,113,095 B2 | 9/2006 | Kuzma et al. | |
| 7,740,292 B1 * | 6/2010 | Fattori | B65D 90/22 292/307 R |
| 7,805,706 B1 * | 9/2010 | Ly | G06F 9/5083 709/221 |
| 2001/0011222 A1 | 8/2001 | McLauchlin et al. | |
| 2001/0018666 A1 | 8/2001 | Sugiyama et al. | |
| 2001/0018739 A1 | 8/2001 | Anderson et al. | |
| 2001/0037309 A1 | 11/2001 | Vrain | |
| 2002/0019759 A1 * | 2/2002 | Arunapuram | G06Q 10/04 705/7.26 |
| 2002/0049622 A1 * | 4/2002 | Lettich | G06Q 10/063 705/7.11 |
| 2002/0065738 A1 * | 5/2002 | Riggs | G06Q 10/0631 705/334 |
| 2002/0087415 A1 | 7/2002 | Allen et al. | |
| 2002/0103767 A1 * | 8/2002 | Bournat | G06Q 20/04 705/75 |
| 2002/0123917 A1 * | 9/2002 | Wolfe | G06Q 10/08 340/5.9 |
| 2002/0188513 A1 | 12/2002 | Gil et al. | |
| 2002/0194081 A1 | 12/2002 | Perkowski | |
| 2003/0050891 A1 | 3/2003 | Cohen | |
| 2003/0055675 A1 | 3/2003 | Klein Twennaar | |
| 2003/0130945 A1 | 7/2003 | Force et al. | |
| 2003/0130952 A1 | 7/2003 | Bell et al. | |
| 2003/0163431 A1 | 8/2003 | Ginter et al. | |
| 2003/0208421 A1 | 11/2003 | Vicknair et al. | |
| 2003/0208441 A1 | 11/2003 | Poplawski et al. | |
| 2003/0227392 A1 * | 12/2003 | Ebert | G06K 17/00 340/8.1 |
| 2005/0144126 A1 * | 6/2005 | Commodore | G06Q 20/10 705/40 |
| 2005/0209913 A1 * | 9/2005 | Wied | G06Q 10/08 705/12 |
| 2007/0100711 A1 * | 5/2007 | Stroh | G06Q 10/087 705/28 |
| 2007/0192216 A1 | 8/2007 | Arnold et al. | |

OTHER PUBLICATIONS

Car Loans in Minutes, Bank Management, vol. 69, No. 4, pp. A23, Apr. 1993, (Dialog Abstract), one page.
International Search Report, International Application No. PCT/US94/05046, 2 pages, citing 9 references, dated Jun. 27, 2004.

* cited by examiner

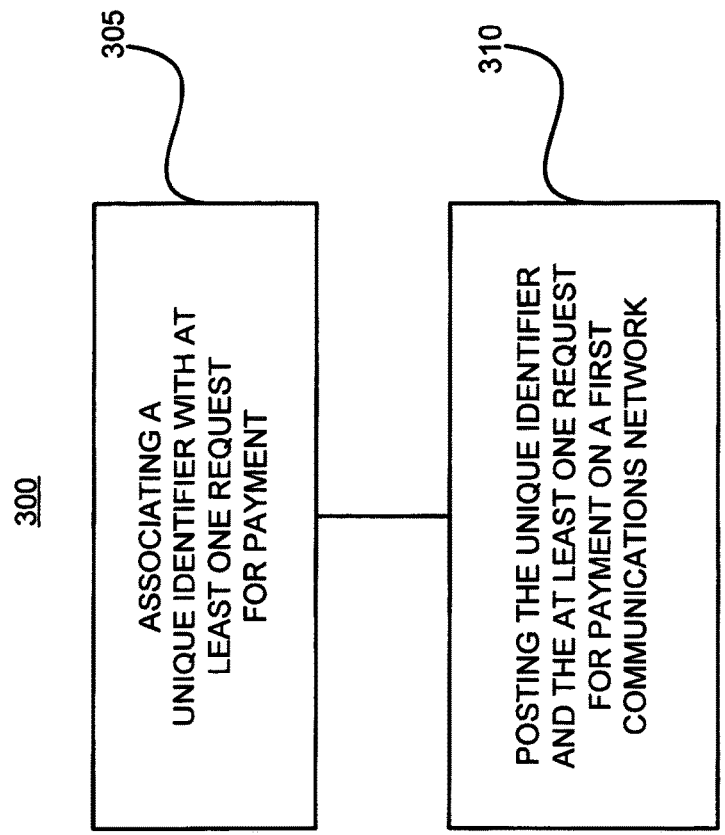

SYSTEM AND METHOD FOR TRADE PAYMENT EXCHANGE

RELATED APPLICATIONS

This application is a Divisional of U.S. patent application Ser. No. 10/767,445, filed Jan. 30, 2004, the disclosure of which is incorporated by reference in its entirety.

FIELD OF THE INVENTION

This invention relates generally to a system and method for exchanging information and documents related to the processing of trade transactions and, more particularly, to a system and method for streamlining order, payment, and collections functions.

BACKGROUND OF THE INVENTION

International trade and finance is complex, expensive, and paper-intensive. Both buyers (importers) and vendors (exporters) are required to prepare, exchange, and process numerous commercial and financial documents associated with each transaction. High-volume exporters and importers are particularly faced with overwhelming paperwork, expense, and administrative challenges.

Presently, global trade transactions involve a rudimentary yet error-prone process. Assume, for example, that a buyer located in the United States wants to purchase goods from a vendor in the Philippines. To initiate the transaction, the buyer will customarily prepare and submit to the vendor a purchase order containing information such as the items or products desired, the quantity, and other relevant details, such as expected delivery date and location, for example. The buyer may also include financing documents, such as a letter of credit or open account documents, for example, which may be prepared by the buyer's bank and help to speed up the order. A letter of credit is an instrument under which the issuer (usually a bank), at the buyer's request, agrees to honor the draft or other demand for payment made by the vendor, as long as the draft or demand complies with specified conditions, and regardless of whether any underlying agreement between the buyer and the vendor is satisfied. An open account, on the other hand, is an unpaid or unsettled account that is left open for ongoing debt and credit entries and that has a fluctuating balance until either party finds it convenient to settle and close, at which time there is a single liability. Both forms of payment are commonly used in international trade transactions.

Back to the hypothetical, assuming the documents are in proper order the vendor will deliver a request for payment (or invoice) to the buyer, along with shipping documents detailing delivery date and location, for example. The buyer reviews these documents for accuracy and completeness and arranges for or authorizes payment, usually through its own bank. The exchange of documents between buyers and vendors is commonly done through standard mail delivery systems, such as government mail services and private express delivery services, for example. More sophisticated buyers and vendors may use more immediate forms of communication, such as the Internet and other forms of electronic communication, for example.

Though the above process seems simple and straightforward, it results in numerous inefficiencies. Documents, for example, may not arrive in a timely fashion or may not be easily interpreted by the recipient. This can lead to needless confusion and delay in the delivery and negotiation of order details, giving rise to excess fees and costs. Further, the terms of an incoming purchase order may not be properly reconciled with a vendor's invoice, requiring the parties to examine each of the documents to ensure accuracy and completeness, resulting again in excess fees and costs. Also, many foreign vendors, particularly those in lesser developed countries, lack access to present-day technologies that enable more efficient delivery and processing of documents, such as the Internet, for example. Further complicating matters, delivery of the products or items to the buyer must comply with international, foreign, federal, and/or state regulations, and must thus be maintained in a legible and complete manner.

These and other problems exist.

SUMMARY OF THE INVENTION

An object of the present invention is to overcome the aforementioned and other drawbacks existing in prior art systems and methods.

An object of the present invention is to provide a system and method that channels, collects and organizes documents related to a trade transaction, or any other type of transaction.

Yet another object of the present invention is to provide a system and method for streamlining order initiation by converting purchase orders to letters of credit and open account payment instruments.

Another object of the present invention is to enable a user (e.g., buyer, vendor, financial institution, or other party) to manage, coordinate and/or administer its import supply chain activity from purchase order to payment.

Yet another object of the present invention is to provide a system and method that enhances collaboration between buyers and their vendors by offering on-line visibility of outstanding transactions and shipping documents.

Another object of the invention is to provide an on-line collaborative financial settlement tool that will allow its user to identify, track and manage open account payments as well as letters of credit over the Internet or other network.

Yet another object of the invention is to streamline the preparation and presentation of paper-based shipping documents.

Another object of the invention is to provide a system and method where buyers, vendors, and other parties may track and exchange information and documents related to a trade transaction.

Yet another object of the invention is to track shipments to assist with payment and insurance matters.

According to one embodiment of the invention, a method for exchanging information and documents related to the processing of trade transactions is provided. The method comprises associating a unique identifier with at least one shipping document; and posting the unique identifier and the least one shipping document on a first communications network.

In another embodiment of the invention, a method for exchanging information and documents related to the processing of trade transactions is provided. The method comprises receiving a purchase order from a buyer; making the purchase order available to a vendor; receiving an invoice and shipping documents based on the purchase order from the vendor; and associating a unique identifier with the purchase order, invoice, and shipping documents.

In another embodiment of the invention, a method for order fulfillment is provided. The method comprises receiving an electronic purchase order from a buyer; generating an open account or a letter of credit based on the purchase order; sending the open account or the letter of credit to a vendor; receiving at least one of an invoice and shipping documents from the vendor; associating a unique identifier with the invoice and/or shipping documents; storing the unique identifier and the shipping document in a searchable database; and posting the unique identifier and the shipping documents on a network.

In another embodiment of the invention, a method for conducting a trade transaction is provided. The method comprises receiving at least one purchase order document, the at least one purchase order document being prepared by a financial institution based on a buyer's purchase order corresponding to a trade transaction; providing the bank with at least one of an invoice and shipping documents associated with the trade transaction; receiving a unique identifier from the bank relating to the trade transaction; and using the unique identifier to search a network for further information on the trade transaction.

In yet another embodiment of the invention, a system for exchanging information and documents related to the processing of trade transactions is provided. The system comprises means for associating at least one unique identifier with at least one shipping document; and means for posting the at least one unique identifier and the at least one shipping document on a network for viewing.

In yet another embodiment of the invention, a method for purchasing a product is provided. The method comprises forwarding a purchase order to a financial institution; receiving from the financial institution a unique identifier associated with the purchase order; and using the unique identifier to search a database associated with the financial institution for further information and/or documents relating to the purchase order.

In another embodiment of the invention, a method for conducting a trade transaction is provided. The method comprises uploading a purchase order file to a server; populating a letter of credit based on the contents of the purchase order file; associating a unique identifier with the letter of credit; posting the letter of credit to a network; uploading to the server at least one of an invoice and shipping documents related to the letter of credit and/or purchase order; associating the unique identifier with the at least one invoice and shipping documents; and posting the at least one invoice and shipping documents on the network for review.

In yet another embodiment of the invention, a method for conducting a trade transaction is provided. The method comprises completing a payment request form; creating a bar-coded cover page; attaching shipping documents related to the trade transaction to the bar-coded cover page; and transmitting the bar-coded cover page and shipping documents to an intermediary for posting on a network.

In another embodiment of the invention, a system for conducting a trade transaction is provided. The system comprises means for completing a payment request form; means creating a bar-coded cover page; means for attaching shipping documents related to the trade transaction to the bar-coded cover page; and means for transmitting the bar-coded cover page and shipping documents to an intermediary for posting on a network.

In yet another embodiment, a system for coordinating trade-related documents corresponding to a particular trade transaction is provided. The system comprises: means for transmitting at least one trade-related document; means for receiving the at least one trade-related document; means for posting the at least one trade-related document; and means for associating the at least one trade-related document with at least one unique identifier.

In yet another embodiment, a method for conducting a trade transaction is provided. The method comprises: uploading a purchase order file to a server; populating a shipping instruction based on the contents of the purchase order file; associating a unique identifier with the shipping instruction; posting the posting the shipment instruction to a network; uploading to the server at least one of an invoice and shipping documents related to the shipment instruction and/or purchase order; associating the unique identifier with the at least one of the invoice and shipping documents; and posting the at least one of the invoice and shipping documents on the network for review.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 3 is a is a process flow diagram illustrating a method for exchanging information and documents related to the processing of trade transactions, according to one embodiment of the invention.

DETAILED DESCRIPTION OF THE INVENTION

Figure 1:
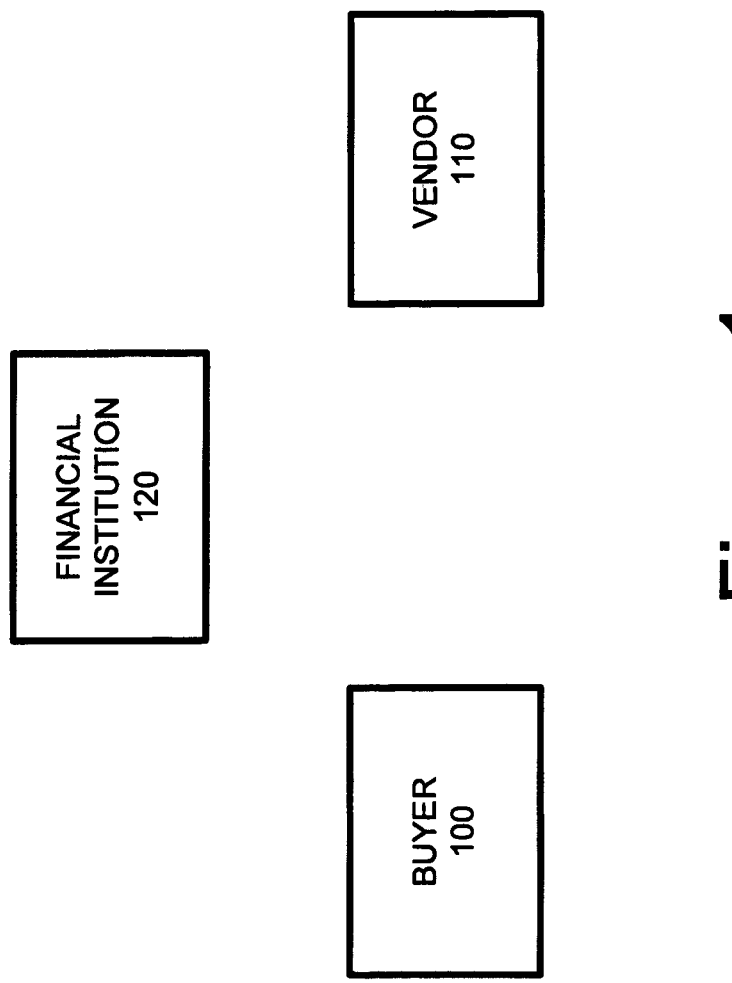
FIG. 1 is a block diagram illustrating the typical parties to an international trade transaction, namely, the buyer, financial institution, and vendor.

Reference will now be made to the present preferred embodiments of the invention, examples of which are illustrated in the accompanying drawings in which like reference characters refer to corresponding elements.

The present invention is described in relation to a system and method for exchanging information and documents related to international trade transactions. Nonetheless, the characteristics and parameters pertaining to the system and method may be applicable to transactions associated with other types of content and/or industries, to include domestic trade, for example.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Among many potential uses, the present invention may be used to: (1) permit the sending, receiving and posting of trade documents in electronic and imaged format; (2) allow parties to a trade transaction—the buyer, vendor, financial intermediary, and any third party(ies), such as freight forwarders, customs brokers, shipping companies, government agencies and officials (e.g., FDA), and/or any individual or entity involved with the movement or shipment of goods or services related to the trade transaction, for example—to post, view and access documents relating to the trade transaction; (3) allow the vendor to complete payment requests based on the buyer's purchase order requirements, for example; (4) allow any party to the transaction to transmit and receive documents via facsimile transmission or other form of imaged transfer; (5) allow any party to the transaction to examine and assess trade documents; (6) allow any party to negotiate payment terms, for example; and (7) allow the vendor to request immediate payment, such as may be obtained through some form of offered or affiliated financial program, for example.

In one embodiment, the present invention allows an intermediary financial institution, such as a bank, for example, to post images of documents—such as purchase orders, requests for payment (invoices), and shipment documents, for example—received in connection with a particular trade transaction on a network for viewing by the parties to the trade transaction. Such documents may be received by the intermediary financial institution via facsimile, mail, electronic mail, or any other form of communication, electronic (such as Electronic Data Interchange (or EDI)) or otherwise. The documents may be electronically imaged by the buyer or vendor prior to transmission to the bank, or by the bank upon receipt. The bank may further index the documents to correspond to a specific identifier, such as a number or bar-code, for example. In another embodiment, posting of trade documents may be performed by the buyer, vendor, and/or third party associated with the particular transaction.

In another embodiment, the financial institution may convert the documents to an appropriate electronic medium (e.g., scan or image) to allow it to be viewed over the Web, using a standard Web browser connected to the Internet, for example. For instance, the imaged and indexed documents may be stored on a searchable database, where parties to the trade transaction (e.g., the buyer (importer) and vendor (exporter)) may view and access them over the Internet, for example. The imaged and indexed documents may also permit the trade parties to examine the documents prior to making payment and/or delivery, as well as facilitate clearing the goods through customs and comply with relevant other regulations. In another embodiment, the buyer, for example, may complete payment over the network, such as by completing the vendor's request for payment form on the network.

In another embodiment, the system and method of the invention may prompt the buyer, vendor, or intermediary financial institution, for example, to print a paper cover-page indexing and attaching the various trade transaction documents sent or received. The cover-page may further designate a unique identifier, such as a bar-code, and may also be imaged and stored on a searchable database along with the corresponding trade transaction documents. The stored bar-code cover page and document may permit monitoring and tracking of the related transaction(s) and corresponding documents and information. The stored cover-page and associated documents may then be viewed and accessed by the trade parties over a network, such as the Internet, for example. In one embodiment, the bar code may represent a reference number associated with the vendor's payment request, for example, permitting the buyer to view and access the shipping documents before approving payment and authorizing delivery, for example.

In another embodiment, the invention enables a user to efficiently manage its import chain activity from purchase order to payment—via a single, network-delivered system. For instance, the user may manage its entire purchase order portfolio, including letters of credit and open account purchases, and upload purchase orders seamlessly from its back office into letters of credit or open account purchase orders. In another embodiment, vendors may view and negotiate the purchase orders and present invoices and requests for payment electronically.

In yet another embodiment, the invention provides a network-based capability that allows buyers (importers) and sellers (exporters) to exchange information and documents related to the processing of trade transactions. In particular, the system allows for the creation of a bar-coded cover page that may be used to index (and attach) shipping documents when they are faxed or transmitted to the bank, for example. The faxed and indexed images of these documents may then stored and made available for viewing by the bank and the buyer (importer) as PDF files, for example. The system may permit the buyer (importer) and seller (exporter) to negotiate the final settlement of the invoice amount and may enable the buyer to authorize final payment to the seller.

In another embodiment, the invention enables a vendor to electronically prepare and submit for payment an invoice or request for payment. For example, the vendor may complete a payment request form by interacting with a graphical user interface. The invoice may then be stored in a database and posted for viewing by the buyer. The vendor may create a bar-coded cover page which is attached to shipping documents related to the trade transaction. The vendor may also transmit the bar-coded cover page and shipping documents to an intermediary for posting on a network.

Although most embodiments of the invention described herein involve transmission of documents to a financial intermediary for posting, it is nonetheless contemplated that buyers, vendors, and appropriate third parties may also post such documents. For example, the buyer may transmit purchase order documents directly to the vendor, or may post such documents on the network itself.

Further, to the extent an embodiment described herein involves populating information provided on a document, including imaged documents, such population may be done manually, or with some form of optical character recognition (OCR) technique, for example.

FIG. 1 illustrates each of the parties that may be part of a trade transaction: the buyer (importer) 100, the vendor (exporter) 110, and the financial institution 120. According to one embodiment of the present invention, the financial institution 120 may serve as an intermediary between the buyer and vendor and may channel, collect, organize, and maintain, for example, documents relating to the trade transaction. In one embodiment, the financial institution 120 may be any bank, institution, business entity, organization, partnership, association, corporation or individual that serves as an intermediary between the buyer and vendor. Alternatively, the functions of the intermediary may be performed by the buyer and/or the seller, or any other entity or individual affiliated therewith.

Figure 2:
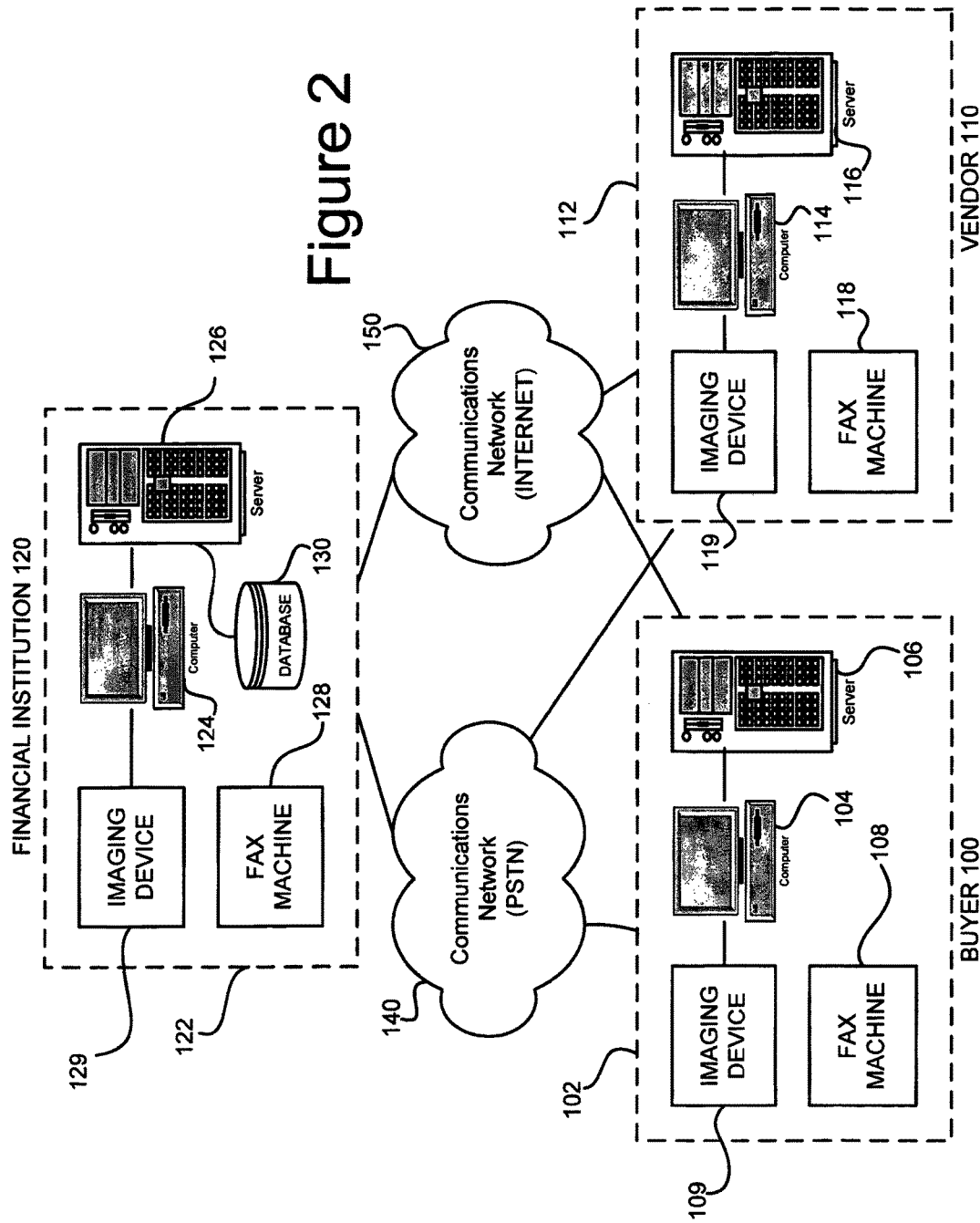
FIG. 2 is a block diagram illustrating a system for exchanging information and documents related to the processing of trade transactions, according to one embodiment of the invention.

FIG. 2 is a comprehensive block diagram illustrating several embodiments of the present invention. Systems 102, 112, and 122 correspond to buyer 100, vendor 110, and financial institution 120, respectively, and may be interconnected by communication networks 140 and 150. Systems 102, 112, and 122 may be used to send and receive the various documents associated with a given trade transaction, such as purchase orders, invoices, financing documents, and shipping documents, for example.

Communications network 140 preferably comprises a telephone communications network, such as the Public Switched Telephone Network (PSTN). In another embodiment, communications network 140 may comprise a Personal Branch Exchange (PBX), which may further connect to the PSTN. Communications network 140 may be used by the buyer 100, vendor 110, and financial institution 120, for example, to transmit and receive facsimile transmissions of documents, including but not limited to purchase orders, financial documents, requests for payment (invoices), shipping documents, and any document created to identify stored trade documents, such as a bar-coded cover page, for example. For instance, the vendor 110 may fax its shipping documents to the financial institution 120, which in turn associates a bar-coded cover page, for example, with the faxed image of the shipping documents and stores them in a searchable database where they may be accessed and viewed by the buyer 100 and other interested parties. Voice communication between the parties is also possible over communications network 140.

Communications network 150 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. Communications network 150 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 150 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Communications network 150 may be used by buyer 100, vendor 110, and financial institution 120 to transmit and receive trade-related documents, including but not limited to purchase orders, financial documents, requests for payment (invoices), shipping documents, and any document created to identify stored trade documents, such as a bar-coded cover page, for example. For instance, the vendor 110 may electronically mail (e-mail) its shipping documents to the financial institution 120, which in turn associates a bar-coded cover page, for example, with the electronic image of the shipping documents and stores them in a searchable database where they may be viewed by the buyer 100 and other interested parties.

Systems 102, 112, and 122 each respectively comprise computer or client stations 104, 114, and 124; servers 106, 116, and 126; facsimile (fax) machines 108, 118, and 128; and imaging devices 109, 119, an 129. Each is described in more detail.

Client stations 104, 114, and 124 may comprise or include, for instance, a personal or laptop computer running a Microsoft Windows™ 95 operating system, a Windows™ 98 operating system, a Millenium™ operating system, a Windows NT™ operating system, a Windows™ 2000 operating system, a Windows XP™ operating system, a Windows CE™ operating system, a PalmOS™ operating system, a Unix™ operating system, a Linux™ operating system, a Solaris™ operating system, an OS/2™ operating system, a BeOS™ operating system, a MacOS™ operating system, a VAX VMS operating system, or other operating system or platform. Client stations 104, 114, and 124 may include a microprocessor such as an Intel x86-based or Advanced Micro Devices x86-compatible device, a Motorola 68K or PowerPC™ device, a MIPS device, Hewlett-Packard Precision™ device, or a Digital Equipment Corp. Alpha™ RISC processor, a microcontroller or other general or special purpose device operating under programmed control. Client stations 104, 114, and 124 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Client stations 104, 114, and 124 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Client stations 104, 114, and 124 may also include a network-enabled appliance such as a WebTV™ unit, a radio-enabled Palm™ Pilot or similar unit, a set-top box, a networkable game-playing console such as a Sony™ Playstation™, Sega™ Dreamcast™ or a Microsoft™ XBox™, a browser-equipped or other network-enabled cellular telephone, or another TCP/IP client or other device.

Client stations 104, 114, and 124 may utilized by a buyer, vendor or financial institution to input information or create documents related to a given trade transaction, including but not limited to purchase orders, financial documents, requests for payment (invoices), shipping documents, and any document created to identify stored trade documents, such as a bar-coded cover page, for example. In one embodiment, for example, a buyer may interface with a graphical user interface (or GUI) to input information in a predetermined form related to purchase order details. A vendor may likewise interface with a GUI to input information relating to an invoice or request for payment, for example. A financial institution may interface with a GUI to manually or automatically input information relating a financial document, such as a letter of credit or open account document associated with a particular trade transaction. All parties may further interact with a GUI in client stations 104, 114, and 124, for example, to create a unique identifier, such as a bar-coded cover page, or to obtain information and/or access and view documents relating to a particular trade transaction. Information and/or documents created by any party may be transmitted via standard mail, overnight mail, transmission over either network 140 or 150, as well as through any electronic transfer means, such as EDI, for example.

Servers 106, 116, and 126 may each comprise a single server or engine (as shown). In another embodiment, servers 106, 116, and 126 may comprise a plurality of servers or engines, dedicated or otherwise, which may further host modules for performing desired system functionality. Servers 106, 116, and 126, for example, may host one or more applications or modules that function to permit interaction between the users (e.g., buyers, vendors, financial institutions and other parties) as it relates to exchanging information and documents related to the processing of trade transactions, for example. For instance, the servers 106, 116, and 126 may include an administration module that serves to permit interaction between the system and the individual(s) or entity(ies) charged with administering systems 102, 112, and 122. Servers 106, 116, and 126 may further include module(s) for creating unique identifiers to associate with a collection of stored documents corresponding to a particular trade transaction, such as a bar-coded cover page, for example. Other modules may permit users to access and view documents over a network which relate to a particular trade transaction (See FIG. 2*b*). Servers 106, 116, and 126 may include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Facsimile devices 108, 118, and 128 may comprise standard facsimile machines and may be used by either the buyer 100, financial institution 120, and/or the vendor 110 to transmit or receive documents relating to international trade transactions, for example. In one embodiment, facsimile devices 108, 118, and 128 are connected to the PSTN. In this embodiment, for example, the vendor 110 can fax to the financial institution shipping documents related to a particular trade transaction. The financial institution, in turn, stores the fax image of the shipping documents in a searchable database along with a unique identifier, such as a bar-coded cover page, that permits the buyer (or other interested party) to access and view the documents over the Internet, for example. In another embodiment, the vendor creates a unique identifier, such as a bar-coded cover page, and faxes it to the financial institution along with its shipping documents. In yet another embodiment, facsimile devices 108, 118, and 128 may comprise a facsimile module associated with clients stations 104, 114, and 124 or servers 106, 116, and 126, which permit facsimile transmission of documents or images through client stations 104, 114, and 124 or servers 106, 116, and 126, for example. In this embodiment, for example, documents prepared by a word processing or spreadsheet application may be transmitted via facsimile directly from client stations 104, 114, and 124 or servers 106, 116, and 126.

Imaging devices 109, 119, and 129 may comprise any device which is capable of producing storable images. In one embodiment, imaging devices 109, 119, and 129 may comprise a table or hand-held scanner that is able to image trade-related documents, including but not limited to purchase orders, financial documents, requests for payment (invoices), shipping documents, and any document created to identify stored trade documents, such as a bar-coded cover page, for example. In another embodiment, imaging devices 109, 119, and 129 may comprise a standard facsimile machine. For instance, the vendor 110 may fax its shipping documents to the financial institution 120, which in turn creates a bar-coded cover page, for example, which is imaged using imaging device 129, associated with the fax image of the shipping documents, and stored therewith in a searchable database where they may be viewed by the buyer 100 and other interested parties. Alternatively, the vendor may create, image and fax the bar-coded cover page to the financial institution, or directly to the financial institution's 126 server or other server, such as a dedicated web server, for example.

Figure 2A:
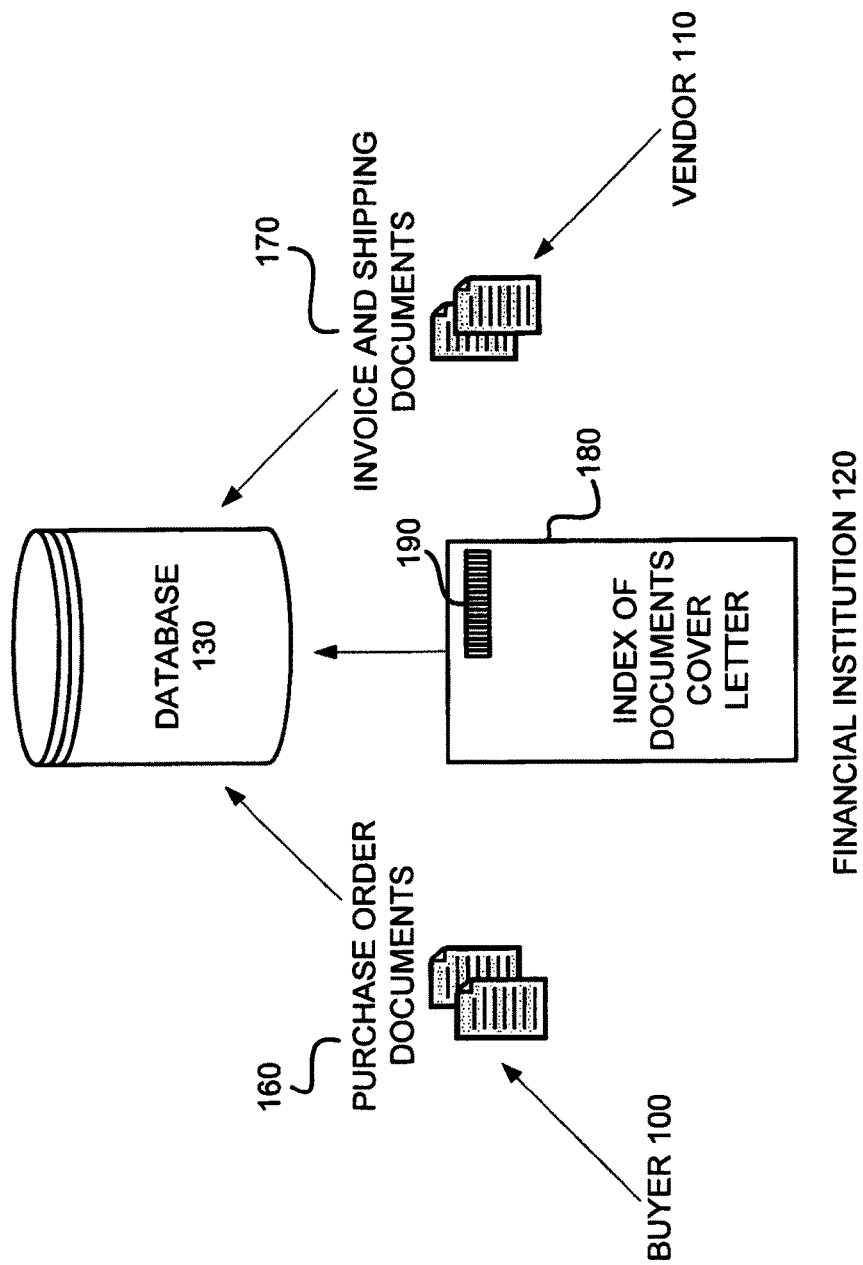
FIG. 2a is a block diagram illustrating typical transmissions and transactions that may take place, according to one embodiment of the invention.

FIG. 2*a* is a schematic representation of typical transmissions and transactions that may take place according to the present invention. As shown, the present invention may store in database 130 imaged documents relating to trade transaction. Buyer 100, for example, may image and store purchase order documents 160 that relate to a particular order. Vendor 110 may image and store invoice and shipping documents 170 corresponding to the purchase order 160, for example. Financial Institution 120 may image and receive, organize and store trade documents sent by buyer 100 and vendor 110. The stored images may be viewed and accessed by any interested party, including the buyer 100, vendor 110, and financial institution 120.

In another embodiment, financial institution 120 may administer the storing of documents in database 130. For instance, buyer 100 and vendor 110 may transmit their respective documents to financial institution 120 via facsimile, for example. Financial institution 120 may then in turn associate the fax images of the documents with a particular unique identifier, such as a cover page, for example. The cover page may be created by either the buyer, vendor, or financial institution. The cover page may list or index the various documents associated with it, such as the corresponding purchase order, invoice and shipping documents, for example. Cover page 180 may be imaged and stored in database 130, so that the buyer and vendor, for example, may view and access the associated documents over the Internet, for example. In one embodiment, cover page 180 is manually created by either the buyer, vendor, or financial institution, while in another embodiment it is automatically created (e.g. populated) with information from the purchase order, invoice, shipping documents, or any other trade-related document. Such population of information may be performed with known optical character recognition (OCR) techniques, for example.

In another embodiment, cover page 180 may further comprise a bar-code 190 that specifically relates to a particular trade transaction and the corresponding trade documents. Bar code 190 may be a one, two, or three-dimensional bar-code. A one-dimensional bar-code is "vertically redundant", meaning that the same information is repeated vertically. The heights of the bars can be truncated without any loss of information. Vertical redundancy allows a symbol with printing defects, such as spots or voids, to still be read. A two-dimensional code stores information along the height as well as the length of the symbol, while a three-dimensional barcode is any linear (one-dimensional) bar-code that is embossed on a surface. This bar-code may be read by using differences in height, rather than contrast, to distinguish between bars and spaces using a special reader. In another embodiment, a plurality (i.e., more than one) bar code may be provided to correspond with particular aspects or details of a particular trade transaction and its corresponding documents, for example.

Database 130 may comprise, include or interface to an Oracle™ relational database such as that sold commercially by Oracle Corporation. Other databases, such as an Informix™ database, a Database 2 (DB2) database, a Sybase database, an On Line Analytical Processing (OLAP) query format database, a Standard Query Language (SQL) format database, a storage area network (SAN), a Microsoft Access™ database or another similar data storage device, query format, platform or resource may be used.

Figure 2B:
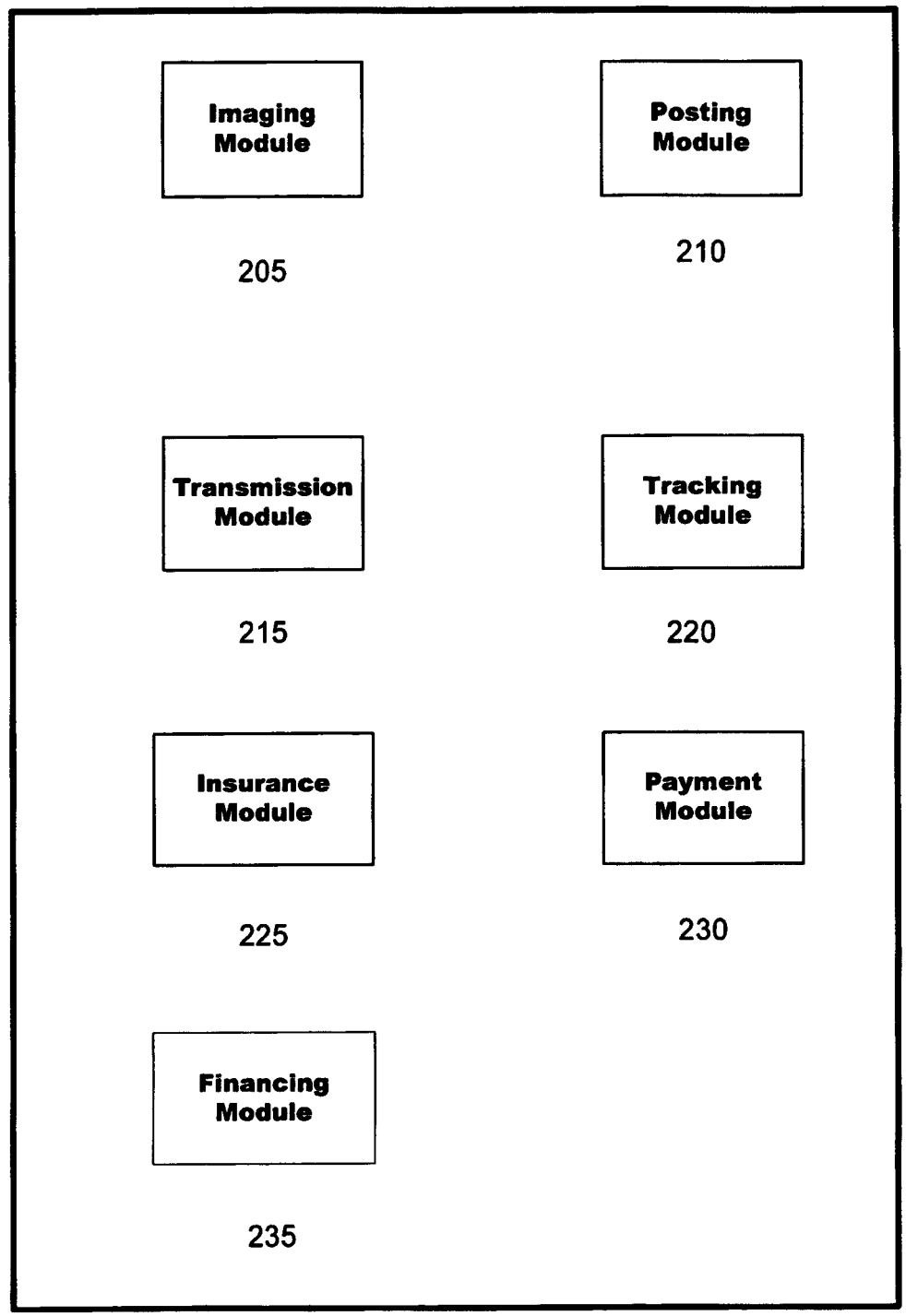
FIG. 2b is a block diagram illustrating exemplary modules associated with the system of FIG. 2, according to one embodiment of the invention.

FIG. 2b illustrates exemplary modules that may be associated with any or all of the servers 106, 116 and/or 126 for carrying out (or administering) the various functions and features of the invention described herein. In one embodiment, the modules may be accessed by a buyer, vendor, financial intermediary, or any other third party, for example, through appropriate graphical user interfaces (or GUI). While the modules may not be necessary to perform some or all of the functions of the present invention, they are nonetheless presented as possible embodiments:

Imaging module 205, for example, may permit the buyer 100, vendor 110, and/or financial institution 120 to manage the imaging of corresponding trade documents. In one embodiment, imaging module 205 may be associated with imaging devices 109, 119, and/or 129 and/or fax machines 108, 118, and/or 128.

Posting module 210 may be used by buyer 100, vendor 110, or financial intermediary 120 to post imaged documents to the network or directly to searchable database 130, for example. In one embodiment, the imaged documents may be posted by the financial institution 120. In another embodiment, the imaged documents may be posted by the buyer 100 or vendor 110. In yet another embodiment, posting module 210 may be associated with imaging module 205 to facilitate the imaging and posting process.

Transmission module 215 may be used to facilitate transmission of documents between the various parties to a trade transaction, for example. The buyer, for example, may transmit purchase order documents directly to vendor 110 or financial intermediary 120. Similarly, the vendor 110 may transmit invoice and shipping documents directly to buyer 100 or financial intermediary 120. In one embodiment transmission module 215 may comprise (or be associated with) proprietary transmission systems and methods, such as Electronic Data Interchange (EDI) or other similar structured delivery format.

Tracking module 220 may be used by any party to a trade transaction, for example, to track the trade process, such as where in the process a particular good, shipment or trade document may be found. For example, the buyer may use tracking module 220 to determine if the goods have been shipped and, if so, when delivery can be expected. Similarly, tracking module 220 may be used to assess the need to insure goods in transit, for example, or to determine when payment may be made. Other parties, such as the vendor and financial intermediary, for example, may use tracking module 220 for similar tracking purposes. In one embodiment, tracking module 220 may comprise (or be associated with) a third party tracking system, such as a global positioning system (GPS) or courier-type tracking service, for example.

Insurance module 225 may be used to facilitate the process of insuring goods in transit, for example. For instance, assume a particular shipment of goods is in the open seas heading toward a hurricane (or war torn country), for example. The buyer, vendor, or financial intermediary may decide to obtain additional insurance against destruction or loss of the goods. In one embodiment, insurance module 225 may cooperate with the insurance department of the financial intermediary, or with a third party provider, for example, to facilitate the insurance process. Insurance module 225 may also cooperate with tracking module 220 to determine the exact location of the good in shipment, for example. This may enable any party to the trade transaction to readily obtain insurance in an ad-hoc or impromptu manner, for example.

Payment module 230 may be used to facilitate payment of goods purchased, for example. In one embodiment, payment module 230 may be used by the buyer 100 to present payment to the vendor after determining all documents are in order. Payment may be made directly to the vendor 110, or to the financial institution 120, for example. In another embodiment, payment module 230 may be used to automatically trigger payment of a shipment upon a particular or predetermined occurrence, such as entry of the shipped goods into U.S. territory, for example. Payment module 230 may work in conjunction with tracking module 220 to track delivery of the goods. Other events or occurrence may be used to trigger or schedule payment.

Financing module 235 may be used to obtain or offer financing for a particular trade transaction, for example. In one embodiment, financial intermediary 120 may permit the buyer and/or vendor to obtain financing for the transaction or purchases related to the transaction, for example. Such financing may be provided by the financial intermediary itself, or through affiliated third parties. In one embodiment, for example, the vendor 110 may desire immediate payment for a given transaction. In this situation, information from the buyer's purchase order may be used to obtain such financing. Such information may be populated automatically, entered manually, or through some form of optical character recognition (OCR), and immediately provided to the financing department of the financial intermediary 120, for example, to process and expedite a financing program.

FIGS. 3-8 illustrate various systems of (and transactions performed by) the present invention.

FIG. 3 illustrates a method 300 for exchanging information and documents related to the processing of trade transactions. In one embodiment, method 300 may involve a situation where vendor 110 faxes shipping documents to a financial institution 120 for storing in database 130, for example. In step 305, the financial institution 102 may associate a unique identifier with the vendor's shipping documents. In one embodiment, this may comprise associating (e.g., attaching) and imaging a cover page (i.e., unique identifier) to the shipping documents, for example. The attached documents may then be imaged and stored in database 130 or may be converted to a proper image format and then stored. In another embodiment, the cover page may be created by the vendor and transmitted to the financial institution along with the shipping documents, for example. In yet another embodiment, the cover page may be bar-coded.

Next, at step 310, the unique identifier and the at least one shipping document attached to it may be posted on a first communications network. In one embodiment, the first communications network may comprise the Internet, or any other network or intranet.

Figure 4:
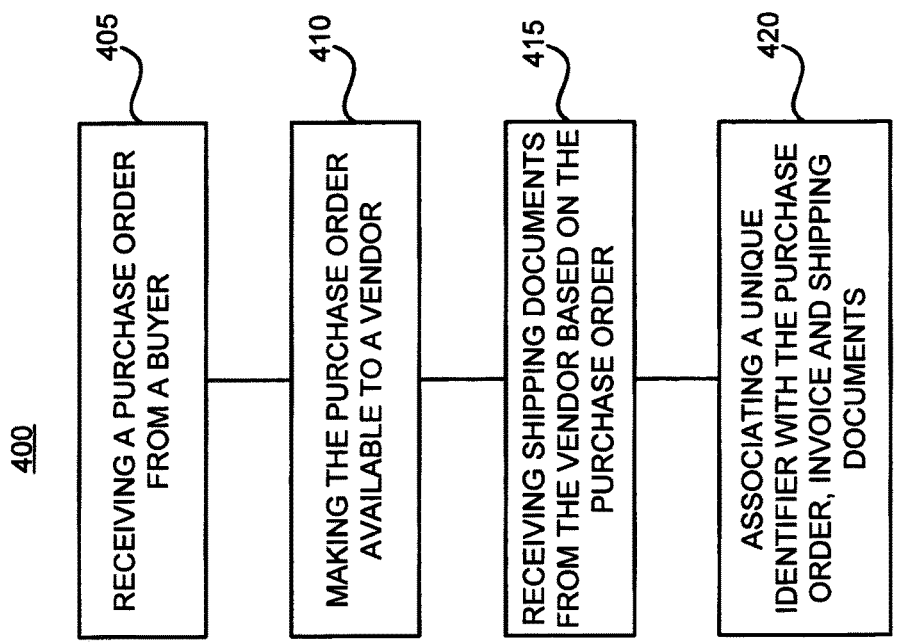
FIG. 4 is a process flow diagram illustrating a method for exchanging information and documents related to the processing of trade transactions, according to one embodiment of the invention.

FIG. 4 illustrates a method 400 for exchanging information and documents related to the processing of trade transactions. At step 405, a purchase order may be received from a buyer. In one embodiment, the purchase order may be received electronically, such as through a facsimile transmission, electronic mail, or EDI. In another embodiment, the purchase order may have been transmitted by the buyer through client station 102. The purchase order may contain information related to a particular trade transaction, such items desired, the quantity, and other information such as, the date and location of the delivery.

At step 410, financial institution 120 may make the purchase order available to a vendor. In one embodiment, this may comprise posting the purchase order on a network, such as, the Internet. At step 415, financial institution 120 may receive from the vendor, shipping documents related to the purchase order. In one embodiment, the shipping documents may be electronically transmitted by the vendor over a network, such as via electronic mail or facsimile transmission. At step 420, the financial institution 120 may associate the unique identifier with at least one of a corresponding purchase order, invoice, and/or shipping documents. In one embodiment, the unique identifier may comprise a bar-coded cover page. In another embodiment, financial institution 120 may store the unique identifier along with the purchase order, invoice and shipping documents in a database 130, where any interested party may access and view the documents.

Figure 5:
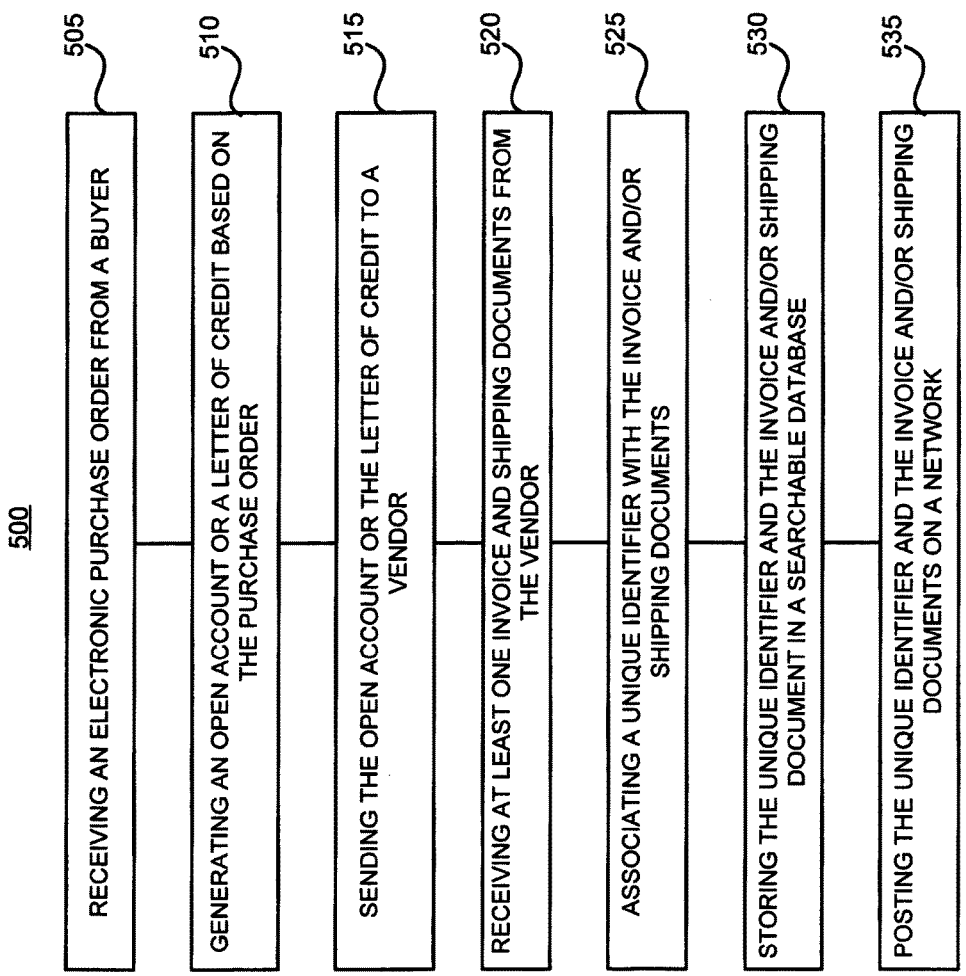
FIG. 5 is a process flow diagram illustrating a method for order fulfillment, according to one embodiment of the invention.

FIG. 5 illustrates a method 500 for order fulfillment. In step 505, a financial institution 120 may receive an electronic purchase order from a buyer. In one embodiment, the electronic purchase order is transmitted over the PSTN network, such as through a facsimile transmission. In another embodiment, an electronic purchase order is transmitted over the Internet, such as through electronic mail. Next, at step 510, financial institution 120 may generate an open account document or a letter of credit based on the contents of the electronic purchase order. At step 515, financial institution 120 may send the open account document or the letter of credit to a vendor. In one embodiment, the open account document or the letter of credit is transmitted to the vendor via the PSTN network, such as through a facsimile transmission. In another embodiment, the open account document or a letter of credit is transmitted over the Internet, such as through electronic mail. At step 520, financial institution 120 may receive at least one invoice and/or shipping document from the vendor. At step 525, the vendor may associate a unique identifier with the invoice and/or the shipping documents, and may further store the unique identifier and the invoice and/or the shipping document in a searchable database 130. At step 535, the unique identifier and the invoice and/or shipping documents may be posted on a network for viewing by a buyer, for example.

Figure 6:
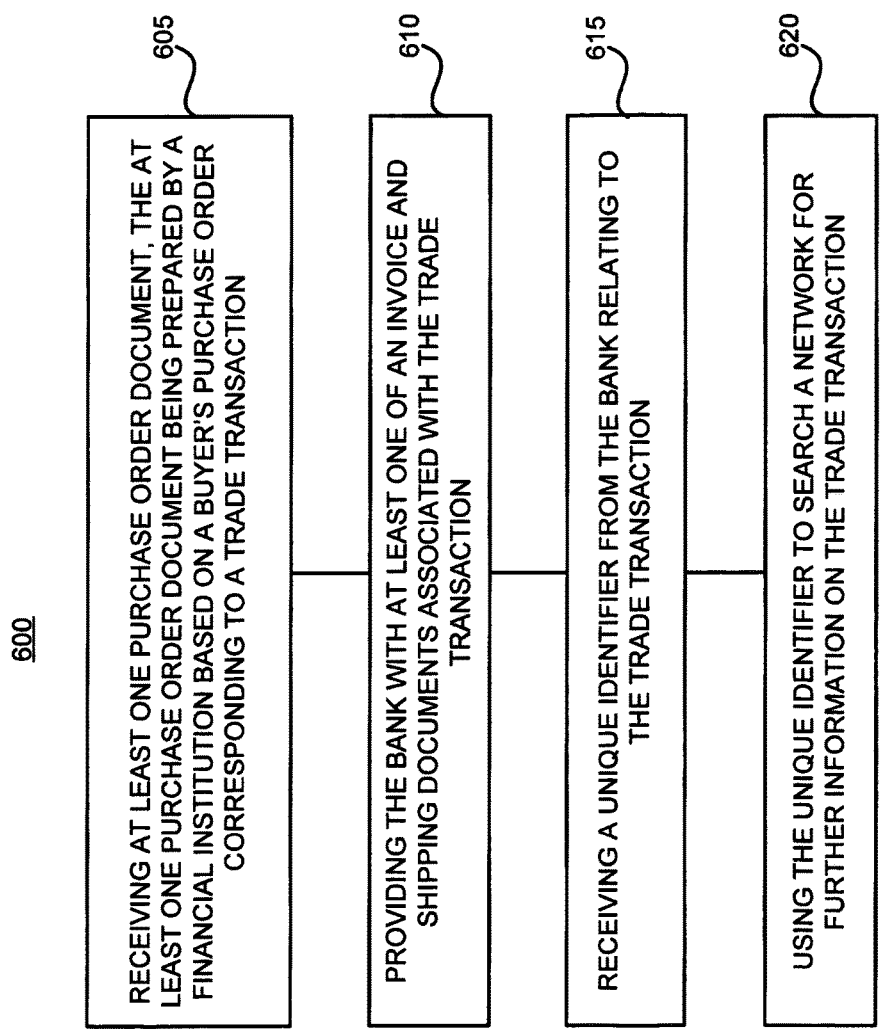
FIG. 6 is a process flow diagram illustrating a method for conducting a trade transaction, according to one embodiment of the invention.

FIG. 6 illustrates a method 600 for conducting a trade transaction. Method 600 may comprise a situation wherein a vendor is coordinating with a financial institution a particular trade transaction. At step 605, the vendor may receive at least one purchase order document from the financial institution. In one embodiment, the at least one purchase order document was prepared by the financial institution based on a particular buyer's purchase order corresponding to the trade transaction. In another embodiment, the at least one purchase order document is received by the vendor over the PSTN, such as a facsimile transmission. In another embodiment, the at least one purchase document is transmitted over the Internet, such as through electronic mail. At step 610, the vendor may provide the financial institution with at least one of an invoice and shipping documents associated with the trade transaction. Next, at step 615, the vendor may receive a unique identifier from the bank relating to the trade transaction. In another embodiment, the vendor may provide the unique identifier along with the invoice or shipping document. At step 620, the vendor and/or buyer may use the unique identifier to search a network for further information on the trade transaction.

Figure 7:
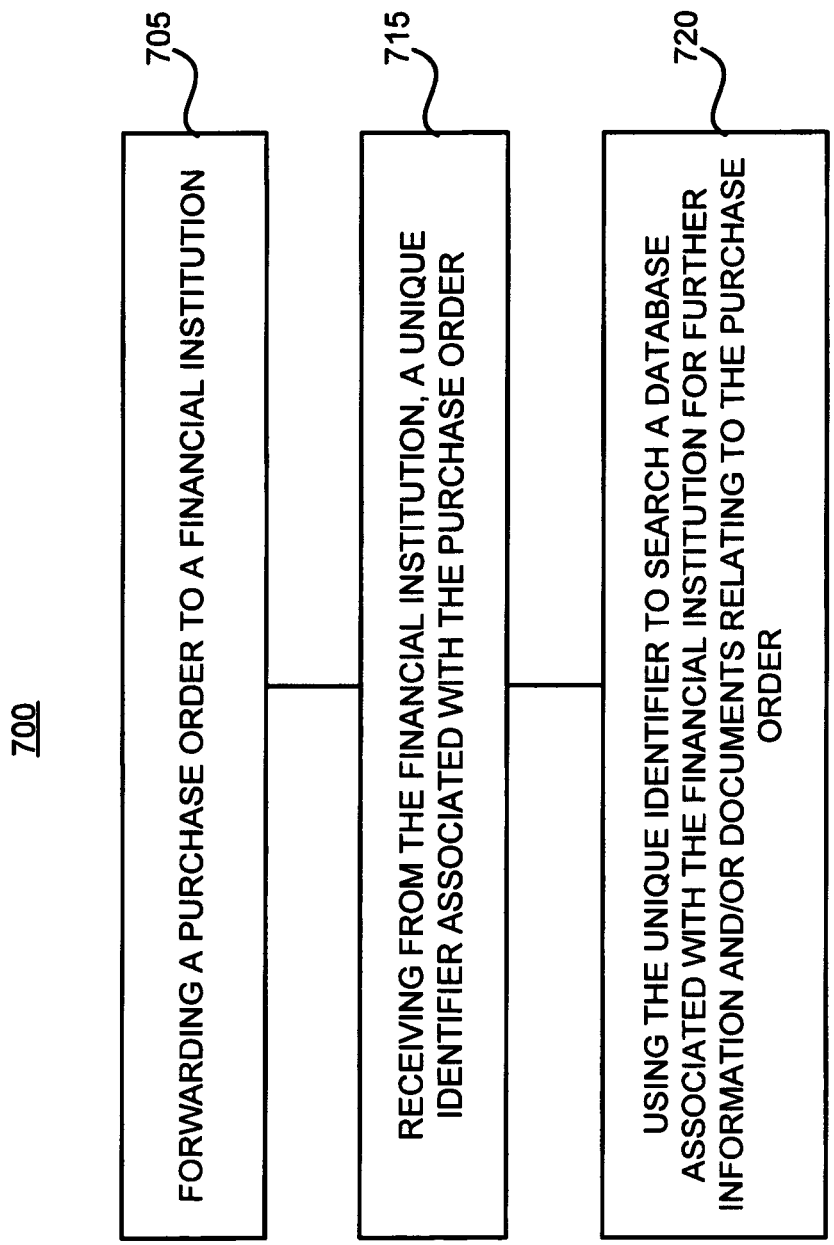
FIG. 7 is a process flow diagram illustrating a method for purchasing a product, according to one embodiment of the invention.

FIG. 7 illustrates a method 700 for purchasing a product. In one embodiment, method 700 may comprise a situation where a buyer 100 is interfacing with a financial institution 120 for purchasing a product from a foreign vendor. At step 705, the buyer 100 may forward a purchase order to a financial institution 120. In one embodiment, the purchase order is transmitted over the PSTN, such as through facsimile transmission. In another embodiment, the purchase order is transmitted over the Internet, such as through electronic mail. At step 715, the financial institution 120 may receive the purchase order from the buyer, and associate a unique identifier therewith. The buyer and/or vendor may then use the unique identifier to search a network for further information and/or documents relating to the purchase order.

Figure 8:
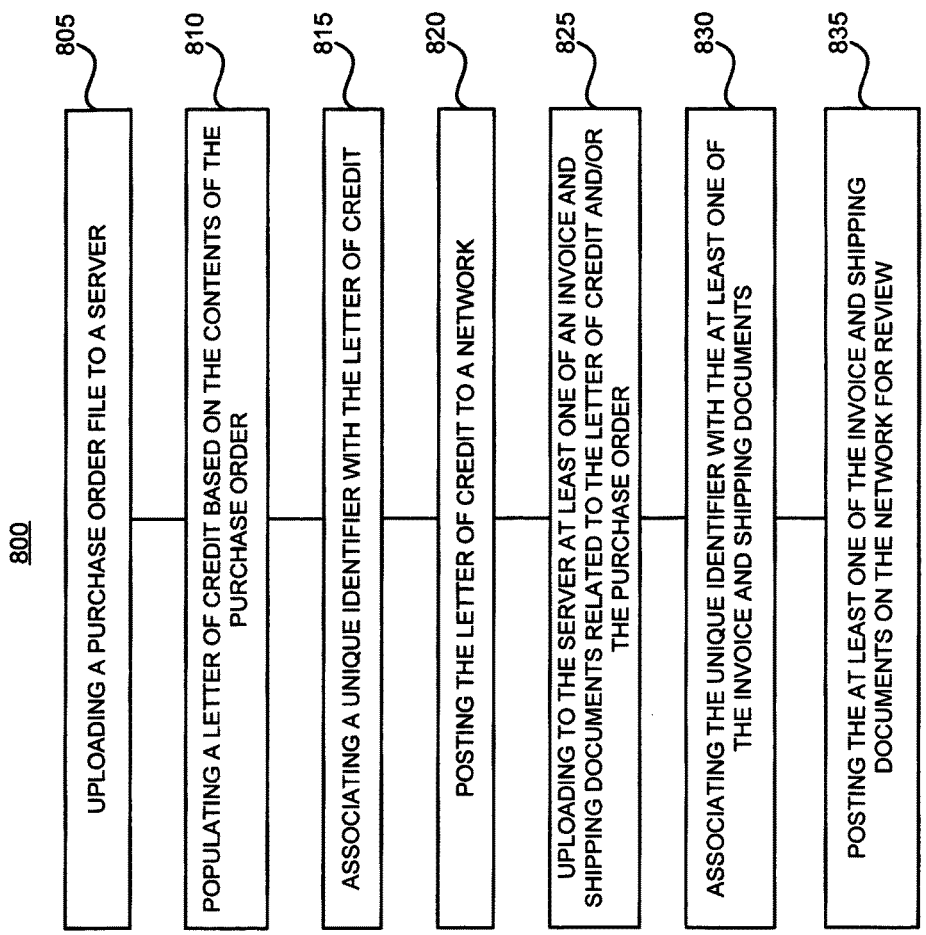
FIG. 8 is a process flow diagram illustrating a method for conducting a trade transaction, according to one embodiment of the invention.

FIG. 8 illustrates a method 800 for conducting a trade transaction. In one embodiment, method 800 comprises a situation where a financial institution 120 coordinates with a buyer 100 in preparing a financial document to present to a vendor. The financial document may comprise a letter of credit or an open account document, either of which is based on the contents of the purchase order. At step 805, financial institution 120 uploads a purchase order file to a server. In one embodiment, the purchase order file is transmitted to the financial institution 120 by the buyer as a facsimile transmission. In another embodiment, the purchase order file is transmitted over the Internet as electronic mail. At step 810, the financial institution 120 may populate a letter of credit or open account document based on the contents of the purchase order. The financial institution 120 may post the letter of credit or open account document to a network, along with the unique identifier. At step 825, the financial institution 120 uploads at least one of an invoice and shipping documents related to the letter of credit and/or purchase order to the server. In one embodiment, the at least one of an invoice and shipping documents is received from the vendor. At step 830, financial institution 120 may associate the unique identifier with the at least one of the invoice and shipping documents. At step 835, the financial institution 120 may post the at least one of the invoice and shipping documents on the network for review by the buyer.

Figure 9:
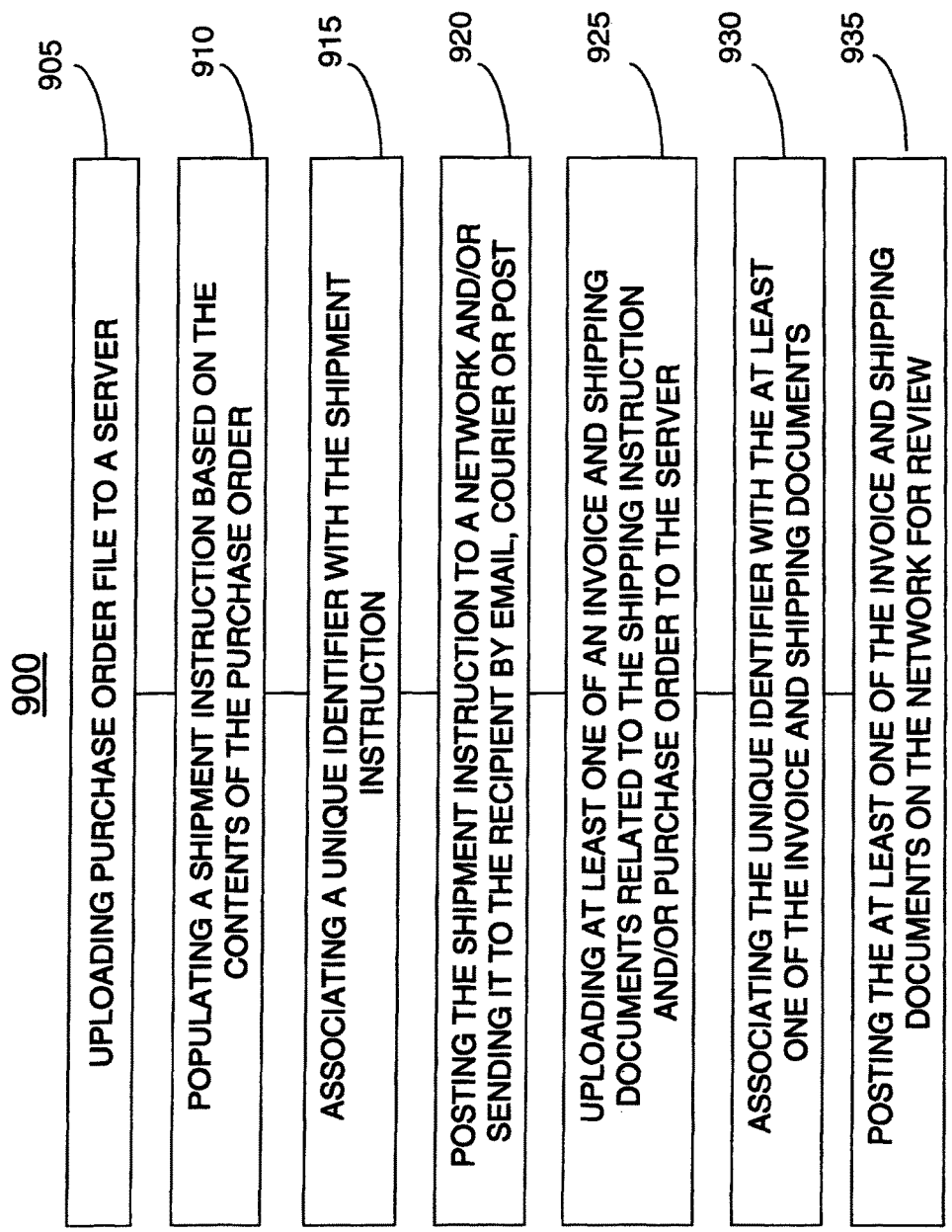
FIG. 9 is a process flow diagram illustrating a method for conducting a trade transaction, according to one embodiment of the invention.

FIG. 9 illustrates a method 900 for conducting a trade transaction. In one embodiment, method 900 comprises a situation where a financial institution 120 coordinates with a buyer 100 in preparing a financial document to present to a vendor. The financial document may comprise an open account shipping instruction, which may be based on the contents of the purchase order. In one embodiment, a shipping instruction may comprise the buyer's instructions to the vendor for an open account transaction, for example. The instructions may also specify groups of purchase orders and their respective shipping schedules and payment terms together with instructions regarding the shipping documents that are required to be submitted to the buyer (or customer), for example, through the financial institution against which a supplier payment will be made. The shipment instructions may also be incorporated in the payment request.

At step 905, financial institution 120 uploads a purchase order file to a server. In one embodiment, the purchase order file is transmitted to the financial institution 120 by the buyer as a facsimile transmission. In another embodiment, the purchase order file is transmitted over the Internet as electronic mail. At step 910, the financial institution 120 may populate a shipping instruction based on the contents of the purchase order. The financial institution 120 may post the shipping instruction to a network, along with the unique identifier. In another embodiment, the shipping instruction may be sent via electronic mail, courier, facsimile, or any other form of mail and/or delivery service. At step 925, the financial institution 120 uploads to the server at least one of an invoice and shipping documents related to the shipping instruction and/or purchase order. In one embodiment, the at least one of an invoice and shipping documents is received from the vendor. At step 930, financial institution 120 may associate the unique identifier with the at least one of the invoice and shipping documents. At step 935, the financial institution 120 may post the at least one of the invoice and shipping documents on the network for review by the buyer.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for order fulfillment, comprising:
a server for a financial institution comprising at least one computer processor receiving an electronic purchase order corresponding to a trade transaction from a buyer system over a communications network;
the server for the financial institution automatically generating an open account or a letter of credit based on the purchase order;
the server for the financial institution electronically sending the open account or the letter of credit to a vendor system over the communication network;
the server for the financial institution receiving at least one of an invoice and shipping documents from the vendor system;
the server for the financial institution generating a unique identifier comprising a machine-readable code for the electronic purchase order and associating the unique identifier with the invoice and/or shipping documents;
the server for the financial institution providing the unique identifier to the vendor system for physical attachment to the invoice and/or shipping document;
the server for the financial institution storing the unique identifier and the invoice and/or shipping documents in a searchable database;
the server for the financial institution posting the unique identifier and the shipping documents on a network;
the server for the financial institution interfacing with a third party tracking system to receive tracking information for a good associated with the trade transaction based on a GPS location of the good;
the server for the financial institution, in cooperation with an insurance module, facilitating insurance for the good based on the GPS location of the good;
the server for the financial institution making the tracking information available to the buyer system and the vendor system on the network; and
the server for the financial institution automatically triggering payment to the vendor system based on a predetermined occurrence identified by the tracking information.

2. A method for order fulfillment, comprising:
a server for a financial institution comprising a computer processor receiving a purchase order file from a buyer system, the purchase order corresponding to a trade transaction;
the server for the financial institution uploading the purchase order file to a server;
the server for the financial institution automatically populating a letter of credit based on the contents of the purchase order file;
the server for the financial institution automatically generating a unique identifier for the purchase order file, wherein the unique identifier comprises a machine-readable code;
the server for the financial institution associating the unique identifier with the letter of credit;
the server for the financial institution providing the unique identifier to a vendor system for physical attachment to the letter of credit;
the server for the financial institution posting the letter of credit to a network;
the server for the financial institution uploading to the server at least one of an invoice and shipping documents related to the letter of credit and/or purchase order;
the server for the financial institution associating the unique identifier with the at least one of the invoice and shipping documents, wherein associating the unique identifier with the at least one of the invoice and shipping documents comprises physically attaching the unique identifier to the at least one of the invoice and shipping document;
the server for the financial institution posting the at least one of the invoice and shipping documents on the network for review by the buyer system and the vendor system;
the server for the financial institution interfacing with a third party tracking system to receive tracking information for a good associated with the trade transaction based on a GPS location of the good;
the server for the financial institution, in cooperation with an insurance module, facilitating insurance for the good based on the GPS location of the good;

the server for the financial institution making the tracking information available to the buyer system and the vendor system on the network; and the server for the financial institution automatically triggering payment to the vendor system based on a predetermined occurrence identified by the tracking information.

3. A method for order fulfillment, comprising:

a server for a financial institution a computer processor receiving a purchase order file;

the server for the financial institution populating a letter of credit based on the contents of the purchase order file, the purchase order corresponding to a trade transaction;

the server for the financial institution populating a shipping instruction based on the contents of the purchase order file;

the server for the financial institution associating a unique identifier comprising a machine-readable code with the shipping instruction;

the server for the financial institution providing the unique identifier to a vendor for physical attachment to the shipping instruction;

the server for the financial institution posting the shipment instruction to a network;

the server for the financial institution uploading to the server at least one of an invoice and shipping documents related to the shipment instruction and/or purchase order;

the server for the financial institution associating the unique identifier with the at least one of the invoice and shipping documents, wherein associating the unique identifier with the at least one of the invoice and shipping documents comprises physically attaching the unique identifier to the at least one of the invoice and any shipping document;

the server for the financial institution posting the at least one of the invoice and shipping documents on the network for review;

the server for the financial institution interfacing with a third party tracking system to receive tracking information for a good associated with the trade transaction based on a GPS location of the good;

the server for the financial institution, in cooperation with an insurance module, facilitating insurance for the good based on the GPS location of the good;

the server for the financial institution making the tracking information available to parties of the trade transaction; and the server for the financial institution automatically triggering payment to the vendor based on a predetermined occurrence identified by the tracking information.

* * * * *